United States Patent [19]

Ryan

[11] 4,256,031
[45] Mar. 17, 1981

[54] HYDRAULIC CIRCUIT COOLING SYSTEM FOR SILAGE COMPACTORS

[75] Inventor: Kelly P. Ryan, Blair, Nebr.

[73] Assignee: Blair Manufacturing Company, Blair, Nebr.

[21] Appl. No.: 79,816

[22] Filed: Sep. 28, 1979

[51] Int. Cl.³ .................. A01F 25/16; B65G 3/04
[52] U.S. Cl. ................................. 100/65; 56/11.9; 60/DIG. 5; 100/100; 100/144; 141/114; 414/132
[58] Field of Search ............... 100/65, 100, 144, 179, 100/189 R, 269 R; 137/334; 56/11.9; 60/DIG. 5; 141/73, 80, 114; 414/132

[56] References Cited

U.S. PATENT DOCUMENTS 3,946,543  3/1976  Templeton .................... 56/11.9
4,046,068  9/1977  Eggenmuller ................. 100/65

Primary Examiner—Billy J. Wilhite
Attorney, Agent, or Firm—Wegner, Stellman, McCord, Wiles & Wood

[57] ABSTRACT

A system for cooling hydraulic fluid in a hydraulic circuit utilized for operating a silage compressor wherein hydraulic fluid is circulated through a tank forming at least a portion of a wall along and in contact with which compressed silage is passed, thereby effecting a heat transfer from the hot hydraulic fluid in the tank to the relatively cool silage passing along the wall.

2 Claims, 3 Drawing Figures

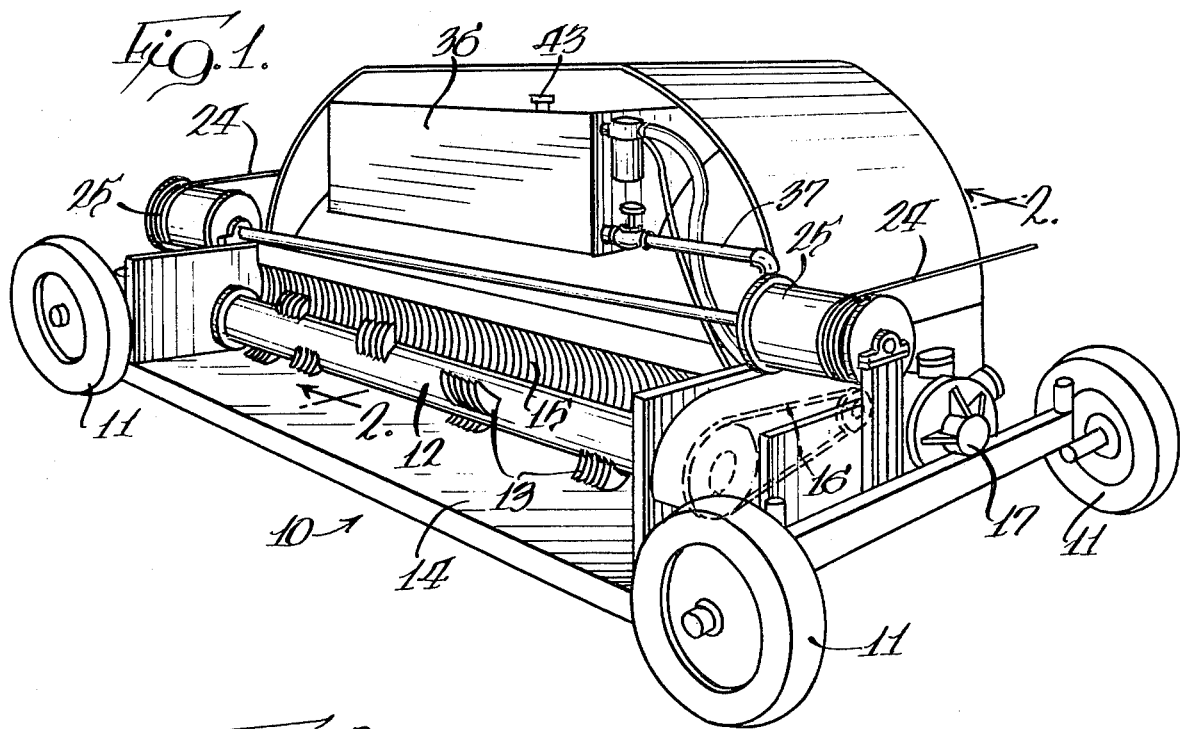
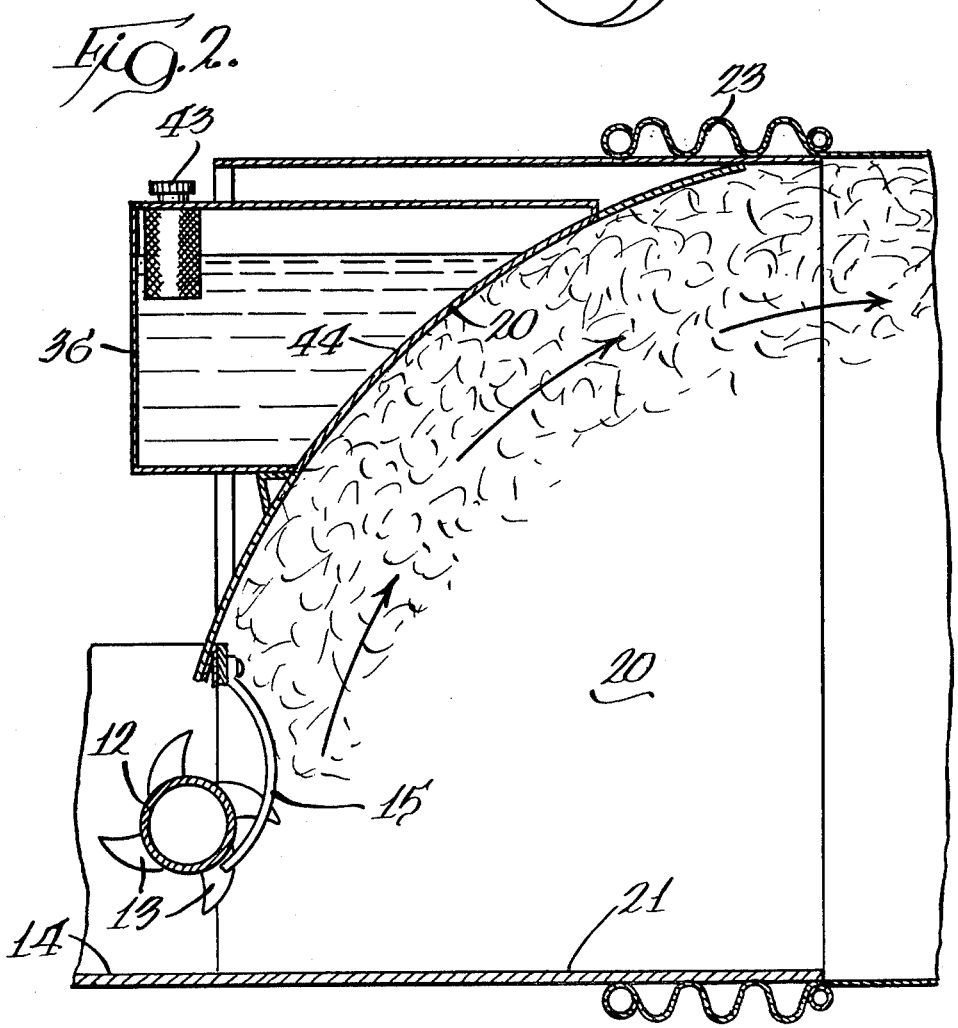

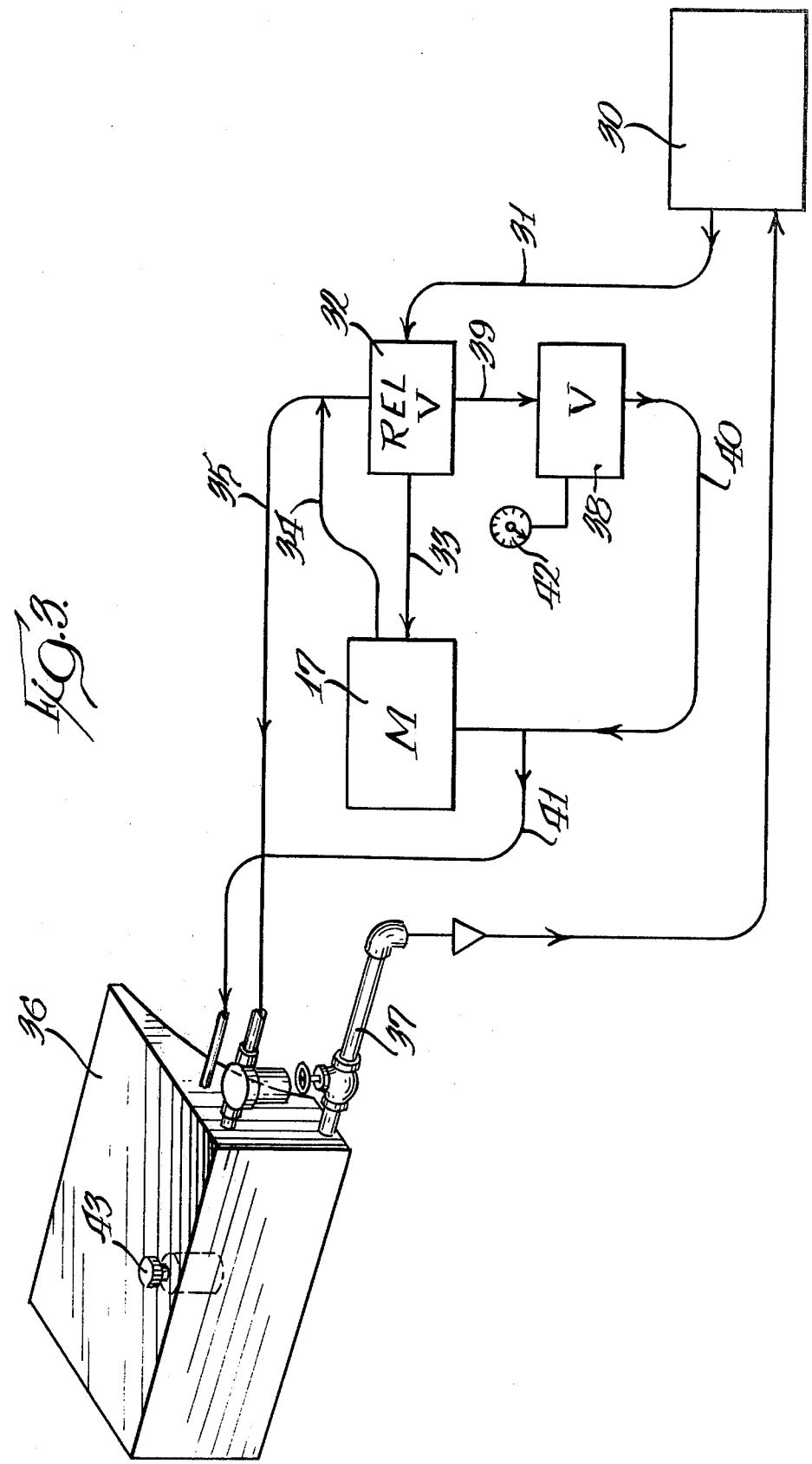

HYDRAULIC CIRCUIT COOLING SYSTEM FOR SILAGE COMPACTORS

BACKGROUND OF THE INVENTION

Silage compression or compacting apparatus, like for example the general system shown in U.S. Pat. No. 4,046,068, sometimes employs a hydraulic circuit including hydraulic pumps and motors for driving the various parts of the system including the means for compressing the silage. As rather large forces are involved and required to drive the various parts of the apparatus to effect the cutting and compaction of the silage, a substantial amount of heat is generated and the hydraulic fluid becomes heated to relatively high temperatures. Cooling must be provided for the hydraulic fluid and this has normally taken the form of coolant radiators of substantial extent. Inasmuch as the silage compacting apparatus of the type herein involved is used primarily in the field and moves at a very slow rate, large coolant radiators are required in order to maintain the hydraulic fluid at workable temperatures.

SUMMARY OF THE INVENTION

In accordance with the present invention, the need for hydraulic coolant radiators of the usual form is eliminated. This is accomplished by providing a tank through which the hydraulic fluid is circulated, with the tank having an exterior wall forming a part of a passage through which the compressed silage is forced. As the silage is relatively cool and passes in thermal transfer relationship along one side of the metal forming the wall, heat from the hydraulic fluid in contact with the other side of the wall is transferred to the silage and thus cooling of the fluid is effected.

BRIEF DESCRIPTION OF THE DRAWINGS

FIG. 1 is a side elevational view of a silage compacting apparatus embodying the invention;
FIG. 2 is a section along line 2—2 of FIG. 1; and
FIG. 3 is a diagrammatic illustration of the hydraulic system of the silage compacting apparatus.

DESCRIPTION OF THE PREFERRED EMBODIMENT

Referring now to the drawings, the silage compacting apparatus as shown in FIG. 1 is of the general type shown in said U.S. Pat. No. 4,046,068, and includes a chassis 10 having four ground wheels 11 for moving the apparatus across the ground. When being moved into postion in the fields, the wheels are arranged as shown in FIG. 1 and the apparatus is towed by a tractor (not shown) to the site of use. The wheels 11 are each borne on axles which can be rotated 90 degrees so as to give the chassis mobility in a direction 90 degrees offset from the direction of movement when being towed.

Carried by the chassis is a rotatably mounted shaft 12 to which is secured a plurality of groups of teeth 13. Below the shaft 12 the chassis has a flat bottom 14. Located immediately behind the shaft 12 is a row of fixed teeth 15, with the teeth 15 being spaced apart so as to permit the teeth 13 to pass therebetween with rotation of the shaft 12. The shaft 12 is rotated by a chain and sprocket device 16, in turn driven by a hydraulic motor 17.

Silage is introduced into the apparatus to cover the bottom 14 and rotation of the shaft 12 serves to force the silage through the fixed teeth 15 and into an expanding chamber 20 located downstream from the teeth 15. The chamber 20 has a flat bottom 21, being a continuation of the bottom 14, and has an arcuately curved top 22. Secured to the top and bottom of the chassis and covering the righthand open end of the chamber 20 (as seen in FIG. 2) is a plastic bag 23. The plastic bag has a closed end which abuts a transportable wall (not shown) secured to the chassis by cables 24 wound about drums 25. Suitable braking means are provided for the drums 25 so that as silage is compacted and forced into the chamber 20 and thence into the plastic bag 23 which abuts against the wall, the pressure serves to move the chassis 10 away from the wall, i.e., in the opposite direction of discharge of the silage, and such movement of the chassis in effect peels off the plastic bag 23 from the chassis to form a long sausage-like container filled with the silage. By adjusting the brake means on the drums 25, the degree of compression of the silage can be determined, i.e., the degree of compressive force necessary to move the chassis away from the wall thereby unreeling the cables, can be modified as desired.

Referring to FIG. 3 of the drawings, the hydraulic circuit utilized to effect the operation of the device includes a pump 30 operated by the power takeoff of a tractor. The pump may be on the tractor itself and driven by the tractor motor, or may be on the chassis and driven by a power takeoff, with the former arrangement being peferred. The discharge of the pump is directed into a line 31 which connects with a relief valve 32. From the relief valve, hydraulic fluid under pressure passes through line 33 to the motor 17 to drive the same. The outlet fom the motor passes into a line 34, into a second line 35, which connects with a makeup and cooling tank 36. Discharge from the tank 36 passes into a line 37 which returns to the pump 30. A control valve 38 is connected by a passage 39 to the relief valve 32 and the control valve discharge 40 is connected by line 41 to the tank 36. A manual control 42 is provided for operating the control valve 38.

When the valve 38 is opened, the outlet 31 of the pump is connected through relief valve 32, passage 39, valve 38, and passageways 40 and 41, to the tank 36, thus in effect directing hydraulic fluid under pressure which would otherwise drive the motor 17, into the tank 36. When control valve 42 is closed, hydraulic fluid under pressure is directed by means of passages 31 and 33 to the motor 17. Should the pressure exceed a predetermined value, relief valve 32 will operate to direct fluid from the outlet 31 into the passage 35.

The tank 36 is provided with a filler cap 43 for adding additional fluid when needed.

Referring to FIG. 2, it will be noted that the tank 36 is provided with an arcuate wall 44 which forms a portion of the arcuate wall 22 of the chamber 20.

From the foregoing, it can be seen that silage introduced into the apparatus along bottom 14 and over the shaft 12 is forced through the teeth 15 and into the chamber 20, expanding in the chamber to fill the same, and then is moved outwardly into the bag 23. The silage passing along the portion of the wall 22 forming the opposite side of the tank wall 44, in effect picks up heat from the wall which is transferred thereto by hydraulic fluid in the tank 36. Thus, cooling of the fluid is effected.

I claim:
1. In combination with silage compressing apparatus having a hydraulic system for forcing silage under com- pression through and in heat transfer relationship with a wall of an expanding chamber, hydraulic fluid cooling apparatus comprising a tank having a wall in thermal transfer relationship with said wall of the chamber, and means for circulating hydraulic fluid in said system through said tank.

2. In combination with silage compressing apparatus having a hydraulic circuit including a hydraulic pump and motor for rotating a toothed shaft for forcing silage under compression through an expanding chamber including an arcuate upwardly extending wall, hydraulic fluid cooling apparatus comprising a tank having a wall forming at least a portion of said arcuate wall, means connecting said tank into said hydraulic circuit for circulating hydraulic fluid therethrough, whereby relatively cool silage moving across said wall portion will remove heat therefrom.

* * * * *